United States Patent
Yang et al.

(10) Patent No.: US 9,994,676 B2
(45) Date of Patent: Jun. 12, 2018

(54) SILICON-CONTAINING POLYMER AND METHOD OF MAKING A SILICON-CONTAINING POLYMER

(71) Applicant: 3M INNOVATIVE PROPERTIES COMPANY, St. Paul, MN (US)

(72) Inventors: Yu Yang, Eden Prairie, MN (US); Miguel A. Guerra, Woodbury, MN (US); Suresh S. Iyer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/313,253

(22) PCT Filed: Jun. 12, 2015

(86) PCT No.: PCT/US2015/035472
§ 371 (c)(1),
(2) Date: Nov. 22, 2016

(87) PCT Pub. No.: WO2015/200003
PCT Pub. Date: Dec. 30, 2015

(65) Prior Publication Data
US 2017/0183448 A1    Jun. 29, 2017

Related U.S. Application Data

(60) Provisional application No. 62/015,912, filed on Jun. 23, 2014.

(51) Int. Cl.
| | | |
|---|---|---|
| *C07F 9/02* | (2006.01) | |
| *C08G 65/26* | (2006.01) | |
| *C08F 283/06* | (2006.01) | |
| *C09D 171/02* | (2006.01) | |
| *C09D 151/08* | (2006.01) | |

(52) U.S. Cl.
CPC ........ *C08G 65/2639* (2013.01); *C08F 283/06* (2013.01); *C09D 151/08* (2013.01); *C09D 171/02* (2013.01)

(58) Field of Classification Search
CPC . C08G 65/2639; C08F 283/06; C09D 171/02; C09D 151/08
USPC ........................................................ 556/405
See application file for complete search history.

(56) References Cited

U.S. PATENT DOCUMENTS

| | | | |
|---|---|---|---|
| 3,322,826 A | 5/1967 | Moore | |
| 4,211,823 A | 7/1980 | Suzuki | |
| 4,929,278 A | 5/1990 | Ashley | |
| 4,966,812 A | 10/1990 | Ashley | |
| 5,081,192 A | 1/1992 | Tatemoto | |
| 5,800,926 A | 9/1998 | Nogami | |
| 5,873,931 A | 2/1999 | Scholz | |
| 6,238,798 B1 | 5/2001 | Kang | |
| 6,261,700 B1 | 7/2001 | Olson | |
| 6,340,404 B1 | 1/2002 | Oka | |
| 6,376,060 B1 | 4/2002 | Yoshihara | |
| 6,416,178 B1 | 7/2002 | Friedman | |
| 6,542,302 B2 | 4/2003 | Cross | |
| 6,558,804 B2 | 5/2003 | Sato | |
| 6,605,229 B2 | 8/2003 | Steiner | |
| 6,660,388 B2 | 12/2003 | Liu | |
| 6,777,070 B1 | 8/2004 | Murata | |
| 6,791,649 B1 | 9/2004 | Nakamura | |
| 6,815,056 B2 | 11/2004 | Choi | |
| 6,816,310 B2 | 11/2004 | Cross | |
| 7,138,185 B2 | 11/2006 | Obayashi | |
| 7,156,530 B2 | 1/2007 | Miyatake | |
| 7,323,514 B2 | 1/2008 | Jing | |
| 7,351,470 B2 | 4/2008 | Draheim | |
| 7,427,648 B2 | 9/2008 | Ochs | |
| 7,473,462 B2 | 1/2009 | Coggio | |
| 7,491,441 B2 | 2/2009 | Pokorny | |
| 7,553,514 B2 | 6/2009 | Fan | |
| 7,592,121 B2 | 9/2009 | Muramatsu | |
| 7,615,283 B2 | 11/2009 | Radcliffe | |
| 7,655,298 B2 | 2/2010 | Thies | |
| 7,678,462 B2 | 3/2010 | Kennedy | |
| 7,703,456 B2 | 4/2010 | Yahiaoui | |
| 7,893,186 B2 | 2/2011 | Yang | |
| 8,138,274 B2 | 3/2012 | Hung | |
| 8,163,357 B2 | 4/2012 | Engardio | |
| 8,202,573 B2 | 6/2012 | Pokorny | |
| 8,241,740 B2 | 8/2012 | Fukushige | |
| 8,268,067 B2 | 9/2012 | Iyer | |

(Continued)

FOREIGN PATENT DOCUMENTS

| | | | |
|---|---|---|---|
| EP | 0343526 A2 * | 11/1989 | ............... C08F 8/26 |
| EP | 0343526 | 9/1993 | |

(Continued)

OTHER PUBLICATIONS

International Search Report; International application No. PCT/US2015/035472.*

Rosen, "Single-Electron Transfer and Single-Electron Transfer Degenerative Chain Transfer Living Radical Polymerization", Chem. Rev. 2009, vol. 109, pp. 5069-5119.

Howell, "The preparation of primary poly-hexafluoropropylene oxide halides (poly-HFPO-CF2X where X ¼ I, Br, Cl and F)", Journal of Fluorine Chemistry, 2004, vol. 125, pp. 1513-1518.

(Continued)

*Primary Examiner* — Sudhakar Katakam
*Assistant Examiner* — Kofi Adzamli
(74) *Attorney, Agent, or Firm* — Bradford B. Wright

(57) ABSTRACT

A silicon-containing polymer is represented by the general formula: (I) wherein A, Q, Z, x, and y are as defined in the specification, and I is iodine. Group Q includes a hydrolyzable silane group and group A is fluorinated. A method of making the silicon-containing polymer is also disclosed.

6 Claims, No Drawings

(56) References Cited

U.S. PATENT DOCUMENTS

| | | |
|---|---|---|
| 8,324,324 B2 | 12/2012 | Yang |
| 8,329,830 B2 | 12/2012 | Yang |
| 8,343,624 B2 | 1/2013 | Walker, Jr. |
| 2004/0077775 A1 | 4/2004 | Audenaert |
| 2006/0147674 A1 | 7/2006 | Walker, Jr. |
| 2006/0147703 A1 | 7/2006 | Walker, Jr. |
| 2006/0147723 A1 | 7/2006 | Jing |
| 2006/0147724 A1 | 7/2006 | Mizuno |
| 2006/0204655 A1 | 9/2006 | Takahashi |
| 2008/0239486 A1 | 10/2008 | Kato |
| 2008/0274352 A1 | 11/2008 | Hao |
| 2010/0035039 A1 | 2/2010 | Jing |
| 2010/0165276 A1 | 7/2010 | David |
| 2012/0040190 A1 | 2/2012 | You |
| 2013/0034653 A1 | 2/2013 | Kumar |

FOREIGN PATENT DOCUMENTS

| | | |
|---|---|---|
| EP | 1607427 | 12/2005 |
| JP | 60-64843 | 4/1985 |
| JP | 2002-122820 | 4/2002 |
| WO | WO 1999/64899 | 12/1999 |
| WO | WO 2002/12404 | 2/2002 |
| WO | WO 2007/053772 | 5/2007 |
| WO | WO 2007/073007 | 6/2007 |
| WO | WO 2011/002666 | 1/2011 |
| WO | WO 2011/005443 | 1/2011 |
| WO | WO 2011/071689 | 6/2011 |
| WO | WO 2011/082063 | 7/2011 |
| WO | WO 2012/106507 | 8/2012 |
| WO | WO 2014/209574 | 12/2014 |
| WO | WO 2015/095123 | 6/2015 |

OTHER PUBLICATIONS

Laird Technologies, [retrieved from internet on Apr. 6, 2014], URL < www.lairdtech.com >, 26 pages.

Gunji, "Preparation and properties of organic-inorganic hybride gel films based on polyvinylpolysilsequioxane synthesized from trimethoxy (vinyl) silane", Applied organometallic chemistry, 2003, vol. 17, pp. 580-588.

International Search Report for PCT International Application No. PCT/US2015/035472 dated Aug. 4, 2015, 3 pages.

* cited by examiner

SILICON-CONTAINING POLYMER AND METHOD OF MAKING A SILICON-CONTAINING POLYMER

TECHNICAL FIELD

The present disclosure broadly relates to silicon-containing polymers and methods of making them.

BACKGROUND

Over the years, various protective coatings have been developed that provide resistance to mechanical damage, corrosion, marine organisms, and/or graffiti. Often these coatings are based on silicone and/or organofluorine chemistry.

Many protective coatings have a high concentration of fluorine in order to achieve a desired level of moisture, chemical, and/or graffiti resistance. However, such compositions typically sacrifice hardness and durability in their quest for repellency. There remains a need for new materials that can be used to make protective coatings on substrates.

SUMMARY

In one aspect, the present disclosure provides a silicon-containing polymer represented by the general formula:

$$A\text{-}[Q]_x\text{-}[Z]_y\text{—I}$$

wherein:
A represents a monovalent group represented by the formula

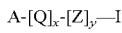

$$R_f^2 R_f^1 R_h\text{—}$$

wherein
$R_h$ represents a covalent bond or an alkylene group having from 1 to 18 carbon atoms,
$R_f^1$ represents a covalent bond or a divalent group selected from the group consisting of —$(CF_2O)_a$—, —$(CF_2CF_2O)_b$—, —$(CF_2CF_2CF_2O)_c$—, —$(CF_2CF_2CF_2CF_2O)_d$—, —$(CF_2CF(CF_3)O)_e$—, and combinations thereof, wherein a, b, c, d, and e represent integers in the range of from 0 to 130, and wherein $1 \leq a+b+c+d+e \leq 130$, and
$R_f^2$ represents a perfluoroalkyl or perfluoroalkoxy group having from 1 to 8 carbon atoms;
each Q independently represents at least one divalent monomeric unit represented by the formula

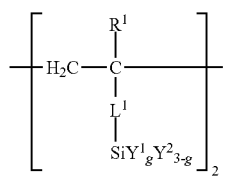

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group, and
g is 0, 1, or 2; and
each Z independently represents a divalent residue of a non-halogenated free-radically polymerizable ethylenically-unsaturated monomer having from 2 to 18 carbons,
wherein x represents an integer greater than or equal to 3, and y represents an integer greater than or equal to zero.

In another aspect the present disclosure provides a method of making a silicon-containing polymer, the method comprising:
i) combining components comprising:
a) a first molar amount of an iodocompound represented by the formula

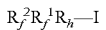

$$R_f^2 R_f^1 R_h\text{—I}$$

wherein
$R_h$ represents a covalent bond or an alkylene group having from 1 to 18,
$R_f^1$ represents a covalent bond or a divalent group selected from the group consisting of —$(CF_2O)_a$—, —$(CF_2CF_2O)_b$—, —$(CF_2CF_2CF_2O)_c$—, —$(CF_2CF_2CF_2CF_2O)_d$—, —$(CF_2CF(CF_3)O)_e$—, and combinations thereof, wherein a, b, c, d, and e represent integers in the range of from 0 to 130, and wherein $1 \leq a+b+c+d+e \leq 130$, and
$R_f^2$ is a perfluoroalkyl or perfluoroalkoxy group having from 1 to 8 carbon atoms;
b) a second molar amount of a free-radically polymerizable silane compound represented by the formula

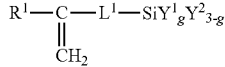

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group,
g is 0, 1, or 2; and
wherein the second molar amount is at least three times the first molar amount; and
c) a free-radical initiator; and
ii) free-radically interpolymerizing at least components a) and b) to provide the silicon-containing polymer.

Silicon-containing polymers according to the present disclosure are moisture-curable and are useful, for example, for providing protective coatings on substrates. Moreover, they can be readily prepared according to the method of the present disclosure.

Features and advantages of the present disclosure will be further understood upon consideration of the detailed description as well as the appended claims.

DETAILED DESCRIPTION

As used herein:
the term "aliphatic" includes the term alicyclic and refers to any organic group or molecule that contains carbon, hydrogen, and optionally one or more of N, O, S, and halogen, but does not contain an aromatic moiety;
the term "alkene" refers to an ethylenically-unsaturated compound consisting of carbon and hydrogen atoms;

the term "fluorinated alkene" refers to an alkene wherein one or more hydrogen atoms have been replaced by fluorine atom(s);

the term "hydrocarbyl" refers to a monovalent radical composed entirely of carbon and hydrogen;

the prefix "(meth)acryl" means "acryl" and/or "methacryl"; and the term "residue of a polymerizable monomer or monomer" in reference to a polymer or oligomer refers to atoms resulting from incorporation of the polymerizable monomer in the polymer or oligomer; for example, a residue of acrylic acid (i.e., $CH_2=CHCO_2H$) would be the divalent radical

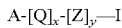

Silicon-containing polymers according to the present disclosure are represented by the following general formula $$A-[Q]_x-[Z]_y-I$$

wherein I represents iodine.

A represents a monovalent group represented by the formula $R_f^2 R_f^1 R_h-$.

$R_h$ represents a covalent bond or an alkylene group having from 1 to 18 carbon atoms, preferably from 1 to 12 carbon atoms, more preferably 1 to 6 carbon atoms, and even more preferably 1 to 4 carbon atoms. Examples of suitable alkylene groups include: methylene, ethylene (i.e., ethane-1,2-diyl), propane-1,3-diyl, propane-1,2-diyl, butane-1,4-diyl, cyclohexane-1,4-diyl, hexane-1,6-diyl, octane-1,8-diyl, decane-1,10-diyl, and octadecane-1,18-diyl.

$R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $1 \leq a+b+c+d+e \leq 130$.

In some embodiments, $1 \leq a+b+c+d+e \leq 130$. In some embodiments, $2 \leq a+b+c+d+e \leq 130$. In some embodiments, at least one of a, b, c, d, ore represents an integer in the range of from 1 or 2 to 130, preferably 1 or 2 to 80, more preferably for 2 to 50, and more preferably 1 or 2 to 40. In some embodiments, at least one of a, b, c, d, or e represents an integer in the range of from 1 or 2 to 10, preferably 1 or 2 to 5. In some embodiments, $1 \leq a+b+c+d+e \leq 50$. In some embodiments, $2 \leq a+b+c+d+e \leq 50$. In some embodiments, $10 \leq a+b+c+d+e \leq 130$. In some embodiments, $10 \leq a+b+c+d+e \leq 50$. In some embodiments, $30 \leq a+b+c+d+e \leq 60$. In some embodiments, $4 \leq a+b+c+d+e \leq 130$, preferably $4 \leq a+b+c+d+e < 80$, more preferably $4 \leq a+b+c+d+e \leq 50$, more preferably $4 \leq a+b+c+d+e \leq 40$, and even more preferably $4 \leq a+b+c+d+e \leq 40$.

Some examples of $R_f^1$ include $-(CF_2O)_{20-30}-$, $-(CF_2CF_2O)_{30-40}-$, $-(CF_2CF_2CF_2O)_{40-50}-$, $-(CF_2CF_2CF_2CF_2O)_{20-30}$, $-(CF_2CF(CF_3)O)_{4-8}-$, $-(CF_2CF(CF_3)O)_{30-40}-$, $-(CF_2CF_2O)_{30-40}(CF_2CF(CF_3)O)_{30-40}-$, and $-(CF_2O)_{20-30}(CF_2CF_2O)_{85-100}-$. When present in combination, the units $-(CF_2O)-$, $-(CF_2CF_2O)-$, 13 $(CF_2CF_2CF_2O)-$, $-(CF_2CF_2CF_2CF_2O)-$, and $-(CF_2CF(CF_3)O)-$, may be present in a random or pseudorandom order and/or in blocks.

$R_f^2$ represents a perfluoroalkyl or perfluoroalkoxy group having from 1 to 8 carbon atoms, preferably from 1 to 6 carbon atoms, more preferably 1 to 4 carbon atoms, and still more preferably from 1 to 3 carbon atoms. Examples include perfluoromethyl, perfluoroethyl, perfluoro-n-propyl, perfluoroisopropyl, perfluorobutyl, perfluoropentyl, perfluorohexyl, and perfluorooctyl, perfluoromethoxy, perfluoroethoxy, perfluoro-n-propoxy, perfluoroisopropoxy, perfluorobutoxy, perfluoropentoxy, perfluorohexoxy, and perfluorooctoxy.

Each Q independently represents at least one divalent monomeric unit represented by the formula

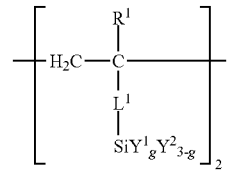

wherein the free valences are indicate by the lines extending through the square brackets.

$R^1$ represents H or methyl, preferably H.

$L^1$ represents a covalent bond or a divalent aliphatic group having from 1 to 10 carbon atoms, preferably 1 to 8 carbon atoms, more preferably 1 to 6 carbon atoms, and more preferably 1 to 4 carbon atoms. In some preferred embodiments, $L^1$ is composed of entirely of carbon and hydrogen. Examples of suitable divalent aliphatic groups include: methylene, ethylene (i.e., ethane-1,2-diyl), propane-1,3-diyl, propane-1,2-diyl, butane-1,4-diyl, cyclohexane-1,4-diyl, hexane-1,6-diyl, octane-1,8-diyl, and decane-1,10-diyl, carbonyloxyethylene, and carbonyloxypropylene.

Each $Y^1$ independently represents a hydrocarbyl group having from 1 to 6 carbon atoms, preferably 1 to 3 carbon atoms, and more preferably 1 or 2 carbon atoms. Examples of $Y^1$ include methyl, ethyl, propyl, butyl, pentyl, cyclohexyl, and phenyl.

Each $Y^2$ independently represents a hydrolyzable group. Such groups are well known in the art and include, for example, chlorine, bromine, alkoxyl groups having 1 to 4 carbon atoms (e.g., methoxy, ethoxy), and alkanecarboxylates having 1 to 4 carbon atoms (e.g., acetate, propionate).

g represents 0, 1, or 2. In some preferred embodiments g is zero.

Each Z independently represents a divalent residue of a non-halogenated free-radically polymerizable ethylenically-unsaturated monomer having from 2 to 18 carbons, preferably having from 2 to 12 carbon atoms, more preferably from 2 to 6 carbon atoms, a more preferably from 2 to 4 carbon atoms. Examples of suitable non-halogenated free-radically polymerizable ethylenically-unsaturated monomer giving rise to such residues include: polymerizable ethylenically-unsaturated monomers include: alpha olefins having from 2 to 18 carbon atoms (e.g., ethylene, propylene, isobutylene, 1-butene, 1-isobutene, 1-hexene, 1-dodecene, and 1-octadecene), styrene a substituted styrenes, vinyl esters (e.g., vinyl acetate), maleic anhydride, N-vinylformamide, N-vinylacetamide, N-vinyl-2-pyrrolidone, vinylphosphonic acid, (meth)acrylonitrile, (meth)acrylamide and N-substituted derivatives thereof, 2-methylvinylphosphonic acid, (meth)acrylic acid, acrylic acid esters having from 4 to 15 carbon atoms (preferably having from 4 to 11 carbon atoms, and more preferably from 5 to 8 carbon atoms), methacrylic acid esters having from 5 to 16 carbon atoms (preferably having from 2 to 12 carbon atoms, and more preferably 6 to 9 carbon atoms), and combinations thereof. Examples of suitable acrylates and methacrylates include octyl (meth)acrylate, nonylphenol ethoxylate (meth)acrylate, isononyl (meth)acrylate, isobornyl(meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl(meth)acrylate, methyl(meth)acrylate, hexyl (meth)acrylate, stearyl (meth)acrylate, hydroxy functional caprolactone ester (meth)acrylate, isooctyl (meth)acrylate, 2-hydroxyethyl (meth)acrylate, 3-hydroxypropyl (meth)acrylate, hydroxyisopropyl (meth)acrylate, hydroxybutyl (meth)acrylate, hydroxyisobutyl (meth)acrylate, and tetrahydrofurfuryl (meth)acrylate.

The subscript x represents an integer greater than or equal to 3 (e.g., 3, 4, 5, 10, 25, 50, 100), while y represents an integer greater than or equal to zero (e.g., 1, 2, 3, 25, 50, 100).

Silicon-containing polymers such as those described above can be made for example by free-radical mediated polymerization of ethylenically-unsaturated free-radically polymerizable monomers in the presence of an iodocompound. As used herein, the term "polymerization" includes oligomerization unless contrary to the context.

Accordingly, silicon-containing polymers according to the present disclosure can be made, for example, by combining components comprising an iodocompound with a free-radically polymerizable silane compound, and a free-radical initiator, and at least partially decomposing the free-radical initiator to form free-radicals thereby causing free-radical polymerization (which may be a "living" free-radical polymerization) resulting in chain growth, and ultimately termination with iodine.

The iodocompound is represented by the formula

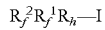

wherein $R_h$, $R_f^1$, and $R_f^2$ are as previously defined. In the above formula, I represents iodine. Examples of suitable iodocompounds include $CF_3CF_2CF_2CF_2CH_2CH_2I$, $CF_3CF_2CF_2O-[CF(CF_3)CF_2O]_kCFICF_3$ where k ranges from 4 to 100 or more (e.g., $CF_3CF_2CF_2O-[CF(CF_3)CF_2O]_{4-8}CFICF_3$ and $CF_3CF_2CF_2O-[CF(CF_3)CF_2O]_{30-40}CFICF_3$).

Additional examples of suitable iodocompounds include (wherein v is an integer from 1 to 18): $(CF_3)_2CF(CH_2)_vI$, $(CF_3)_2CFCH_2I$, $(CF_3)_2CF(CH_2)_vI$, $(CF_3)_3C(CH_2)_vI$, $C_4F_9C_2H_4I$, $CF_3OC_2F_4(CH_2)_vI$, $CF_3(CH_2)_vI$, $CF_3CF_2CF_2(CH_2)_vI$, $CF_3CF_2(CH_2)_vI$, $CF_3O(CF_2O)_{20-30}(CH_2)_vI$, $CF_3CF_2O(CF_2CF_2O)_{30-40}(CH_2)_vI$, $CF_3O(CF_2CF_2CF_2O)_{40-50}(CH_2)_vI$, $(CF_2CF_2CF_2CF_2O)_{20-30}(CH_2)_vI$, $CF_3O(CF_2CF(CF_3)O)_{4-8}(CH(CH_3))_vI$, $CF_3O(CF_2CF(CF_3)O)_{30-40}(CH_2)_vI$, $CF_3CF_2O(CF_2CF_2O)_{30-40}(CH_2)_vI$, $CF_3CF_2O(CF_2CF(CF_3)O)_{30-40}(CH_2)_vI$, and $(CF_3)_2CFOCF_2CF_2I$.

The above-described iodocompounds can be prepared by known methods. For example, the fluoroalkyl iodides can be prepared by displacement of a leaving group (on the fluoroalkyl moiety) by iodide, and the perfluoroalkyl iodides can be prepared by the reaction of a perfluoroolefin (e.g., tetrafluoroethylene or hexafluoropropylene) with $IF_5$ or by decarbonylation of perfluoroacyl halides. Further details and methods are disclosed in U.S. Pat. No. 7,893,186 (Yu et al.). Suitable iodocompounds can also be prepared as generally described by Howell et al. in "The preparation of primary poly-hexafluoropropylene oxide halides (poly-HFPO—$CF_2X$ where X=I, Br, Cl and F)", Journal of Fluorine Chemistry (2004), vol. 125, pages 1513-1518. Many suitable iodocompounds are commercially available.

The free-radically polymerizable silane compound is represented by the formula

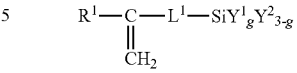

wherein $R^1$, $L^1$, $Y^1$, $Y^2$ and g are as previously defined. Examples of commercially available free-radically polymerizable silane compounds include: (acryloxymethyl)phenethyltrimethoxysilane, (acryloxymethyl)trimethoxysilane, (3-acryloxypropyl)methyldichlorosilane, (3-acryloxy-propyl)methyldiethoxysilane, (3-acryloxypropyl)methyldimethoxysilane, (3-acryloxypropyl)-trichlorosilane, (3-acryloxypropyl)trimethoxysilane, (3-acryloxypropyl)trimethoxysilane, (3-acryloxypropyl)tris(trimethylsiloxy)silane, allylmethyldichlorosilane, allylmethyldimethoxysilane, 11-allyloxyundecyltrimethoxysilane, 3-(3-methacryloxy-2-hydroxypropoxy)propylbis(trimethylsiloxy)methylsilane, n-(3-methacryloxy-2-hydroxypropyl)-3-aminopropyltriethoxysilane, (methacryloxymethyl)bis(trimethylsiloxy)methylsilane, (methacryloxymethyl)dimethylethoxysilane, (methacryloxymethyl)methyldiethoxysilane, (methacryloxymethyl)methyldimethoxysilane, (methacryloxymethyl)phenyldimethylsilane, methacryloxymethylphenethyltris(trimethylsiloxy)silane, methacryloxymethyltriethoxysilane, methacryloxymethyltrimethoxysilane, methacryloxymethyltrimethylsilane, methacryloxymethyltris(trimethylsiloxy)silane, methacryloxypentamethyldisiloxane, 3-methacryloxypropylbis(trimethylsiloxy)methylsilane, 3-methacryloxypropyldimethylchlorosilane, methacryloxypropyldimethylethoxysilane, methacryloxy-propyldimethylmethoxysilane, methacryloxypropylmethyldichlorosilane, methacryloxypropylmethyldiethoxysilane, methacryloxypropylmethyldimethoxysilane, 3-methacryloxypropyltriacetoxysilane, methacryloxypropyltrichlorosilane, methacryloxy-propyltriethoxysilane, methacryloxypropyltriisopropoxysilane, methacryloxypropyltrimethoxysilane, methacryloxypropyltris(methoxyethoxy)silane, methacryloxypropyltris(trimethylsiloxy)silane, methacryloxypropyltris(trimethylsiloxy)silane, methacryloxypropyltris(trimethylsiloxy)silane, methacryloxypropyltris(vinyldimethylsiloxy)silane, vinyl(chloromethyl)dimethoxysilane, vinyldimethylchlorosilane, vinyldimethylethoxysilane, vinyldiphenylchlorosilane, vinyldiphenyl-ethoxysilane, vinylmethylbis(trimethylsiloxy)silane, vinylmethyldiacetoxysilane, vinylmethyl-dichlorosilane, vinylmethyldiethoxysilane, vinylmethyldimethoxysilane, vinyloctyldichlorosilane, vinylphenyldichlorosilane, vinylphenyldiethoxysilane, vinylphenylmethylchlorosilane, vinylphenylmethylmethoxysilane, vinyltriacetoxysilane, vinyltrichlorosilane, vinyltriethoxysilane, vinyltriisopropenoxysilane, vinyltriisopropoxysilane, vinyltrimethoxysilane, vinyltris(1-methoxy-2-propoxy)silane, vinyltris(2-methoxyethoxy)silane, vinyltris(dimethylsiloxy)silane, and vinyltris(trimethylsiloxy)silane, all of which are available from Gelest, Inc., Morrisville, Pa.

The molar amount of the free-radically polymerizable silane compound should be at least three times the molar amount of the iodocompound. In some embodiments, the molar amount of the free-radically polymerizable silane compound should be at least 4, 5, 6, 7, 8, 10, 20, 20, 50, or even at least 100 times the molar amount of the iodocompound, or more.

Examples of suitable free-radical initiators include thermal free-radical initiators (e.g., organic peroxides and certain azo compounds) and photoinitiators. Thermal free-radical initiators are generally preferred. The free-radical initiator(s) is preferably included in an effective amount (i.e., an amount sufficient to carry out the polymerization) although any quantity may be used. Examples of suitable free-radical initiators include Thermal initiators for free-radical polymerization are generally used in effective amounts (e.g., from about 0.01 to 5 percent by weight). Useful thermal initiators include, for example, azo and peroxide initiators. Examples of suitable azo initiators include 2,2'-azobis(2,4-dimethylvaleronitrile); 2,2'-azobis (isobutyronitrile); 2,2'-azobis-2-methylbutyronitrile; and (1,1'-azobis(1-cyclohexanecarbonitrile); 2,2'-azobis(methyl isobutyrate); 2,2'-azobis(2-amidinopropane) dihydrochloride; and 2,2'-azobis(4-methoxy-2,4-dimethylvaleronitrile). Examples of suitable peroxide initiators include benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butyl peroxypivalate, t-butyl peroxy-2-ethylhexanoate, and dicumyl peroxide.

Polymerization is effected by decomposition of the free-radical initiator (e.g., by heating and/or ultraviolet radiation).

In some embodiments, the components further include a non-halogenated free-radically polymerizable ethylenically-unsaturated monomer having from 2 to 18 carbons, preferably, having from 2 to 12 carbon atoms, more preferably from 2 to 6 carbon atoms, a more preferably from 2 to 4 carbon atoms. Examples of suitable non-halogenated free-radically polymerizable ethylenically-unsaturated monomers include: alpha olefins having from 2 to 18 carbon atoms (e.g., ethylene, propylene, isobutylene, 1-butene, 1-isobutene, 1-hexene, 1-dodecene, and 1-octadecene), styrene a substituted styrenes, vinyl esters (e.g., vinyl acetate), maleic anhydride, N-vinylformamide, N-vinylacetamide, N-vinyl-2-pyrrolidone,vinylphosphonic acid, (meth)acrylonitrile, (meth)acrylamide and N-substituted derivatives thereof, 2-methylvinylphosphonic acid, (meth)acrylic acid, acrylic acid esters having from 4 to 15 carbon atoms (preferably having from 4 to 11 carbon atoms, and more preferably from 5 to 8 carbon atoms), methacrylic acid esters having from 5 to 16 carbon atoms (preferably having from 2 to 12 carbon atoms, and more preferably from 6 to 9 carbon atoms), and combinations thereof. Examples of suitable acrylates and methacrylates include octyl (meth)acrylate, nonylphenol ethoxylate (meth)acrylate, isononyl (meth)acrylate, isobornyl(meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl(meth) acrylate, methyl(meth)acrylate, hexyl(meth)acrylate, stearyl (meth)acrylate, hydroxy functional caprolactone ester (meth)acrylate, isooctyl (meth)acrylate, 2-hydroxyethyl (meth)acrylate, 3-hydroxypropyl (meth)acrylate, hydroxyisopropyl (meth)acrylate, hydroxybutyl (meth)acrylate, hydroxyisobutyl (meth)acrylate, and tetrahydrofurfuryl (meth)acrylate.

If desired, solvent may be used in during polymerization to facilitate mixing and/or reaction. Examples of suitable solvents include: aliphatic hydrocarbons (e.g., hexane, heptane, cyclohexane); aromatic solvents (e.g., benzene, toluene, xylene); ethers (e.g., diethyl ether, glyme, diglyme, diisopropyl ether); esters (e.g., ethyl acetate, butyl acetate); alcohols (e.g., ethanol, isopropyl alcohol); ketones (e.g., acetone, methyl ethyl ketone, methyl isobutyl ketone); sulfoxides (e.g., dimethyl sulfoxide); amides (e.g., N,N-dimethylformamide, N,N-dimethylacetamide); halogenated solvents (e.g., ethylchloroform, dichloroethylene, trifluorotoluene); and combinations thereof.

Silicon-containing compounds according to the present disclosure are moisture curable due to hydrolysis of the hydrolyzable groups bound to silicon, followed by cross-linking to form Si—O—Si linkages. Typically, this occurs spontaneously upon standing and/or solvent evaporation of the coating in air containing water vapor to form a crosslinked reaction product. Heat and/or steam (e.g., superheated steam) may be used to accelerate and/or advance curing of the moisture-curable composition.

The resultant crosslinked product may have good mechanical durability (e.g., hardness and/or abrasion resistance), adhesion, and/or repellency properties. It used as a protective coating, the thickness of the protective coating may be, for example, from 10 nanometers to 1 millimeter (mm) or more, more typically from 0.01 mm to 0.3 mm.

Suitable substrates on which the moisture curable composition (and resultant cured composition) may be disposed include, for example, aluminum, stainless steel, glass, copper, silver, kitchen tile, restroom fixtures, plastic film, molded plastic parts, painted and/or clearcoated automotive body panels, marine surfaces (e.g., hulls and trim), motorcycle parts, and cover glasses for electronic displays, Select Embodiments of the Present Disclosure In a first embodiment, the present disclosure provides a silicon-containing polymer represented by the general formula:

$$A\text{-}[Q]_x\text{-}[Z]_y\text{---}I$$

wherein:
A represents a monovalent group represented by the formula

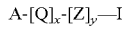

$$R_f^2 R_f^1 R_h\text{---}$$

wherein
$R_h$ represents a covalent bond or an alkylene group having from 1 to 18 carbon atoms,
$R_f^1$ represents a covalent bond or a divalent group selected from the group consisting of —$(CF_2O)_a$—, —$(CF_2CF_2O)_b$—, —$(CF_2CF_2CF_2O)_c$—, —$(CF_2CF_2CF_2CF_2O)_d$—, —$(CF_2CF(CF_3)O)_e$—, and combinations thereof, wherein a, b, c, d, and e represent integers in the range of from 0 to 130, and wherein $1 \leq a+b+c+d+e \leq 130$, and
$R_f^2$ represents a perfluoroalkyl or perfluoroalkoxy group having from 1 to 8 carbon atoms;
each Q independently represents at least one divalent monomeric unit represented by the formula

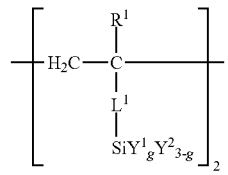

wherein
- $R^1$ represents H or methyl,
- $L^1$ represents a covalent bond or a divalent aliphatic group having from 1 to 10 carbon atoms,
- each $Y^1$ independently represents a hydrocarbyl group having from 1 to 6 carbon atoms,
- each $Y^2$ independently represents a hydrolyzable group, and
- g is 0, 1, or 2; and each Z independently represents a divalent residue of a non-halogenated free-radically polymerizable ethylenically-unsaturated monomer having from 2 to 18 carbons, wherein x represents an integer greater than or equal to 3, and y represents an integer greater than or equal to zero.

In a second embodiment, the present disclosure provides a silicon-containing polymer according to the first embodiment, wherein $R_h$ has from 1 to 4 carbon atoms.

In a third embodiment, the present disclosure provides a silicon-containing polymer according to the first or second embodiment, wherein $R_f^1$ represents a covalent bond.

In a fourth embodiment, the present disclosure provides a silicon-containing polymer according to any one of the first to third embodiments, wherein $R_f^2$ has from 1 to 4 carbon atoms.

In a fifth embodiment, the present disclosure provides a silicon-containing polymer according to any one of the first to fourth embodiments, wherein $L^1$ has from 1 to 4 carbon atoms.

In a sixth embodiment, the present disclosure provides a silicon-containing polymer according to any one of the first to fifth embodiments, wherein each Z independently represents a divalent residue of a non-halogenated free-radically polymerizable ethylenically-unsaturated monomer having from 2 to 8 carbons.

In a seventh embodiment, the present disclosure provides a method of making a silicon-containing polymer, the method comprising:
i) combining components comprising:
a) a first molar amount of an iodocompound represented by the formula

wherein
- $R_h$ represents a covalent bond or an alkylene group having from 1 to 18,
- $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $1 \leq a+b+c+d+e \leq 130$, and
- $R_f^2$ is a perfluoroalkyl or perfluoroalkoxy group having from 1 to 8 carbon atoms;

b) a second molar amount of a free-radically polymerizable silane compound represented by the formula

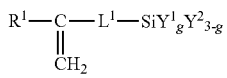

wherein
- $R^1$ represents H or methyl,
- $L^1$ represents a covalent bond or a divalent aliphatic group having from 1 to 10 carbon atoms,
- each $Y^1$ independently represents a hydrocarbyl group having from 1 to 6 carbon atoms,
- each $Y^2$ independently represents a hydrolyzable group,
- g is 0, 1, or 2; and wherein the second molar amount is at least three times the first molar amount; and c) a free-radical initiator; and ii) free-radically interpolymerizing at least components a) and b) to provide the silicon-containing polymer.

In an eighth embodiment, the present disclosure provides a method of making a silicon-containing polymer according to the seventh embodiment, wherein the components further comprise:

d) a non-halogenated free-radically polymerizable ethylenically-unsaturated monomer having from 2 to 18 carbons, and wherein step ii) comprises free-radically interpolymerizing at least components a), b), and c) to provide the silicon-containing polymer.

In a ninth embodiment, the present disclosure provides a method of making a silicon-containing polymer according to the seventh or eighth embodiment, wherein the non-halogenated free-radically polymerizable ethylenically-unsaturated monomer is selected from the group consisting of N-vinylformamide, N-vinylacetamide, vinylphosphonic acid, 2-methylvinylphosphonic acid, acrylic acid, methacrylic acid, acrylic acid esters having from 4 to 15 carbon atoms, acrylic acid esters having from 5 to 16 carbon atoms, alpha olefins having from 2 to 18 carbon atoms, and combinations thereof.

In a tenth embodiment, the present disclosure provides a method of making a silicon-containing polymer according to any one of the seventh to ninth embodiments, wherein $R_h$ has from 1 to 4 carbon atoms.

In an eleventh embodiment, the present disclosure provides a method of making a silicon-containing polymer according to any one of the seventh to tenth embodiments, wherein $R_f^1$ represents a covalent bond.

In a twelfth embodiment, the present disclosure provides a method of making a silicon-containing polymer according to any one of the seventh to eleventh embodiments, wherein $R_f^2$ has from 1 to 4 carbon atoms.

In a thirteenth embodiment, the present disclosure provides a method of making a silicon-containing polymer according to any one of the seventh to twelfth embodiments, wherein $L^1$ has from 1 to 4 carbon atoms.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, materials used in the examples may be obtained from Sigma-Aldrich Company, LLC, Saint Louis, Mo., or other general chemical suppliers, and/or may be made according to known methods.

Preparation of Oligomeric Hexafluoropropylene Oxide Iodide $CF_3CF_2CF_2O[CF(CF_3)CF_2O]_nCFICF_3$, n=4-8 (HF-POI$_{1400}$), A 500-ml three neck round bottom flask equipped with a mechanical stirrer and nitrogen bubbler was charged with 25 g (0.19 mol) of lithium iodide and 220 g (0.17) mol of oligomeric HFPO acid fluoride, $CF_3CF_2CF_2O[CF(CF_3)$ $CF_2O]_nCF(CF_3)C(=O)F$, n=4-8, Mn (1300 g/mol) prepared generally as described in U.S. Pat. No. 3,322,826 (Moore) and heated to 186° C. with an oil bath. At 180° C. the mixture turned purple and decarbonylation occurred. The liquid was decanted from the solid and vacuum distilled from a head temperature of 97-210° C. at 1 mm. Oligomeric iodide $C_3F_7O—[CF(CF_3)CF_2O]_nCFICF_3$, n=4-8 having molecular weight $M_n$=1400 g/mol (HFPOI$_{1400}$) was isolated (212 g yield).

Preparation of Oligomeric Hexafluoropropylene Oxide Iodide $CF_3CF_2CF_2O[CF(CF_3)CF_2]_nCFICF_3$, n=30-40 (HFPOI$_{6000}$)

A 1-L three neck round bottom flask equipped with a mechanical stirrer and nitrogen bubbler was charged with 100 g (0.02 mol) oligomeric HFPO acid, $CF_3CF_2CF_2O[CF(CF_3)CF_2O]_nCF(CF_3)CO_2H$, n=30-40 obtained as KRYTOX 157FSH from E.I. du Pont de Nemours and Co., Wilmington, Del., 100 g of FLUORINERT ELECTRONIC LIQUID FC-770 from 3M Company (Saint Paul, Minn.) and converted to the acid chloride by reaction with 7.5 g (0.06 mol) of thionyl chloride and 1 g of N,N-dimethylformamide at 82° C. over two hours. The reaction resulted in the acid chloride, and was exchanged to the acid fluoride by the addition of 5 g of potassium fluoride (0.08 mol) and heating for 24 hours at 98° C. The reaction was followed by FTIR as the C(=O)Cl 1808 cm$^{-1}$ functional group was converted to C(=O)F 1883 cm$^{-1}$. Conversion to the iodide was done by the addition of 11 g (0.08 mol) of lithium iodide and distilling out the FC-770 before decarbonylation to a temperature of 240° C. for ten minutes. To the reaction product mixture was added 200 g FC770 and 10 g of filtering agent and filtered. The solution was vacuum stripped to obtain 78.5 g of oligomeric iodide $CF_3CF_2CF_2O[CF(CF_3)CF_2O]_nCF(CF_3)CF_2I$, n=30-40 (HFPOI$_{6100}$) in 80% yield, molecular weight $M_n$=6100 g/mol.

Example 1

This example describes the preparation of POLYMER 1,

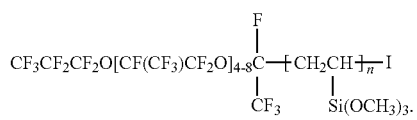

Vinyltrimethoxysilane (50 g, 0.34 mol), 2.5 g of HFPOI$_{1400}$ ($M_n$=1400 g/mol, 0.0014 mol), and 1.1 of dicumyl peroxide were charged into a 250 ml Parr pressure reactor. The reactor was purged with nitrogen for 2 minutes, and then heated at 150° C. for 5 hours. A viscous liquid was thus prepared (POLYMER 1).

Coating preparation: 0.2 g of POLYMER 1, 9.8 g of isopropyl alcohol, and 0.03 g of 5% aqueous hydrochloric acid were mixed in a vial. The resultant solution was coated onto a glass slide using a No. 12 Meyer rod (27.4 microns nominal wet thickness, RD Specialties, Webster, N.Y.). The slide was cured at 120° C. for 10 minutes in an oven resulting in a hydrophobic coating. Contact Angles: advancing water=114°, receding water=112°, advancing hexadecane=76°, receding hexadecane=63°.

Example 2

This example describes the preparation of POLYMER 2,

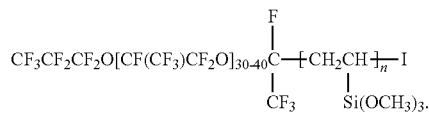

Vinyltrimethoxysilane (44 g, 0.30 mol), 15 g of HFPOI$_{6100}$ ($M_n$=6100 g/mol, 0.0025 mol), 19 g of NOVEC ENGINEERED FLUID HFE-7200 from 3M Company, and 0.36 of dicumyl peroxide were charged into a 50 ml Parr pressure reactor. The reactor was purged with nitrogen for 2 minutes, and then heated at 132° C. for 5 hours. After evaporation of the HFE-7200, a viscous liquid was isolated (POLYMER 2).

Example 3

This example describes the preparation of POLYMER 3,

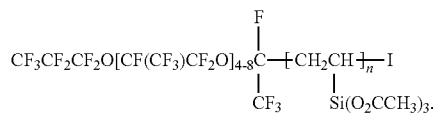

Vinyltriacetoxysilane (50 g, 0.22 mol), 2.5 g of HFPOI$_{1400}$ (0.0018 mol), and 1.1 of dicumyl peroxide were charged into a 250 ml Parr pressure reactor. The reactor was purged with nitrogen for 2 minute, and then heated at 150° C. for 5 hours, after which a light viscous liquid was obtained (POLYMER 3).

Example 4

This example describes the preparation of POLYMER 4,

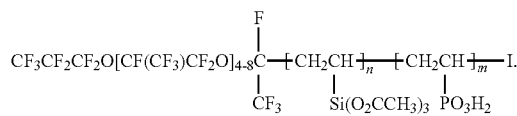

Vinyltrimethoxysilane (50 g, 0.34 mol), 2.5 g (0.23 mol) of vinylphosphoric acid, 2.5 g of HFPOI$_{1400}$ (0.0018 mol), and 1.1 of dicumyl peroxide were charged into a 250 ml Parr pressure reactor. The reactor was purged with nitrogen for 2 minutes, and then heated at 150° C. for 5 hours, resulting in a viscous liquid (POLYMER 4).

Coating preparation: 0.2 g of POLYMER 4, 9.8 g of isopropyl alcohol, and 0.03 g of 5% aqueous hydrochloric acid were mixed in a vial. The resultant solution was coated onto an aluminum plate using a No. 12 Meyer rod (27.4 microns nominal wet thickness). The slide was cured at 120° C. for 10 minutes in an oven resulting in a hydrophobic coating. Contact Angles: advancing water=114°, receding water=106°, advancing hexadecan=75°, receding hexadecane=59°.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A silicon-containing polymer represented by the general formula:

$$A\text{-}[Q]_x\text{-}[Z]_y\text{—I}$$

wherein:

A represents a monovalent group represented by the formula $$R_f^2 R_f^1 R_h\text{—}$$

wherein $R_h$ represents a covalent bond or an alkylene group having from 1 to 18 carbon atoms, $R_f^1$ represents a covalent bond or a divalent group selected from the group consisting of —(CF$_2$O)$_a$—, —(CF$_2$CF$_2$O)$_b$—, —(CF$_2$CF$_2$CF$_2$O)$_c$—, —(CF$_2$CF$_2$CF$_2$CF$_2$O)$_d$—, —(CF$_2$CF(CF$_3$)O)$_e$—, and combinations thereof, wherein a, b, c, d, and e represent integers in the range of from 0 to 130, and wherein 1≤a+b+c+d+e≤130, and $R_f^2$ represents a perfluoroalkyl or perfluoroalkoxy group having from 1 to 8 carbon atoms;

each Q independently represents at least one divalent monomeric unit represented by the formula

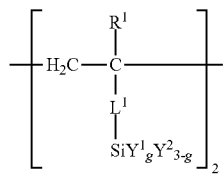

wherein $R^1$ represents H or methyl, $L^1$ represents a covalent bond or a divalent aliphatic group having from 1 to 10 carbon atoms, each $Y^1$ independently represents a hydrocarbyl group having from 1 to 6 carbon atoms, each $Y^2$ independently represents a hydrolyzable group, and g is 0, 1, or 2; and each Z independently represents a divalent residue of a non-halogenated free-radically polymerizable ethylenically-unsaturated monomer having from 2 to 18 carbons, wherein x represents an integer greater than or equal to 3, and y represents an integer greater than or equal to zero.

2. The silicon-containing polymer of claim 1, wherein $R_h$ has from 1 to 4 carbon atoms.

3. The silicon-containing polymer of claim 1, wherein $R_f^1$ represents a covalent bond.

4. The silicon-containing polymer of claim 1, wherein $R_f^2$ has from 1 to 4 carbon atoms.

5. The silicon-containing polymer of claim 1, wherein $L^1$ has from 1 to 4 carbon atoms.

6. The silicon-containing polymer of claim 1, wherein each Z independently represents a divalent residue of a non-halogenated free-radically polymerizable ethylenically-unsaturated monomer having from 2 to 8 carbons.

* * * * *

UNITED STATES PATENT AND TRADEMARK OFFICE
CERTIFICATE OF CORRECTION

PATENT NO. : 9,994,676 B2
APPLICATION NO. : 15/313253
DATED : June 12, 2018
INVENTOR(S) : Yu Yang et al.

It is certified that error appears in the above-identified patent and that said Letters Patent is hereby corrected as shown below:

On the Title Page

Item (*) Notice
Line 3, After "0 days." delete "days.".

Item (57), Column 2 (Abstract)
Line 1, Below "ABSTRACT" insert -- $A\text{-}[Q]_x\text{-}[Z]_y\text{-}I$ (I) --.

In the Specification

Column 3
Line 42, Delete "ore" and insert -- or e --, therefor.

Column 3
Lines 61-62, Delete "13 (CF₂" and insert -- —(CF$_2$ --, therefor.

Column 6
Line 9, Delete "Y²" and insert -- $Y^2$, --, therefor.

Column 6
Line 49, Delete "vinyldiphenyl-ethoxysilane," and insert -- vinyldiphenylethoxysilane, --, therefor.

Column 6
Lines 50-51, Delete "vinylmethyl-dichlorosilane," and insert -- vinylmethyldichlorosilane, --, therefor.

Column 7

Signed and Sealed this
Nineteenth Day of February, 2019

Andrei Iancu
*Director of the United States Patent and Trademark Office*

Line 39, Delete "2-pyrrolidone,vinylphosphonic" and insert -- 2-pyrrolidone, vinylphosphonic --, therefor.

Column 9
Line 25, Delete "$R_f2$" and insert -- $R_f^2$ --, therefor.

Column 11
Line 7, Delete "O-[" and insert -- O[ --, therefor.

Column 11
Line 12, Delete "$CF_2]_n$" and insert -- $CF_2O]_n$ --, therefor.

Column 12
Line 62, Delete "hexadecan" and insert -- hexadecane --, therefor.